United States Patent [19]
Rienks

[11] 4,439,098
[45] Mar. 27, 1984

[54] FRAME-HANDLING-AND-STACKING APPARATUS

[75] Inventor: Bert J. Rienks, Redlands, Calif.

[73] Assignees: Robert L. Bauer, Westminster; Richard Upthegrove, Huntington Beach, both of Calif.

[21] Appl. No.: 79,947

[22] Filed: Sep. 28, 1979

[51] Int. Cl.³ .............................................. B65G 57/00
[52] U.S. Cl. ..................................... 414/43; 271/212; 414/95; 414/97; 414/399; 414/900
[58] Field of Search .................... 414/96, 95, 36, 48, 414/43, 399, 349, 373, 92, 97, 900; 271/212

[56] References Cited
U.S. PATENT DOCUMENTS 3,086,665 4/1963 Schmid ............................ 414/96 X
3,578,182 10/1969 Harvey ................................ 414/43

Primary Examiner—Robert B. Reeves
Assistant Examiner—Douglas D. Watts
Attorney, Agent, or Firm—Francis X. LoJacono

[57] ABSTRACT

An apparatus for handling and stacking building frame structures, wherein the apparatus is positioned adjacent the end of a frame-conveyor system so as to receive a plurality of completed frame sections which are stacked within the apparatus, whereby the stacked frame sections are arranged to be removed by a transfer vehicle. The apparatus comprises a base-frame support having a pair of oppositely positioned, tiltable, truss sections. These truss sections include a carriage structure having a conveyor mounted thereto, the carriage structure being movable upwardly in order to stack the building frame structures on a pair of suspended racks which allows various transfer vehicles to remove the stacked group of frame sections.

13 Claims, 9 Drawing Figures

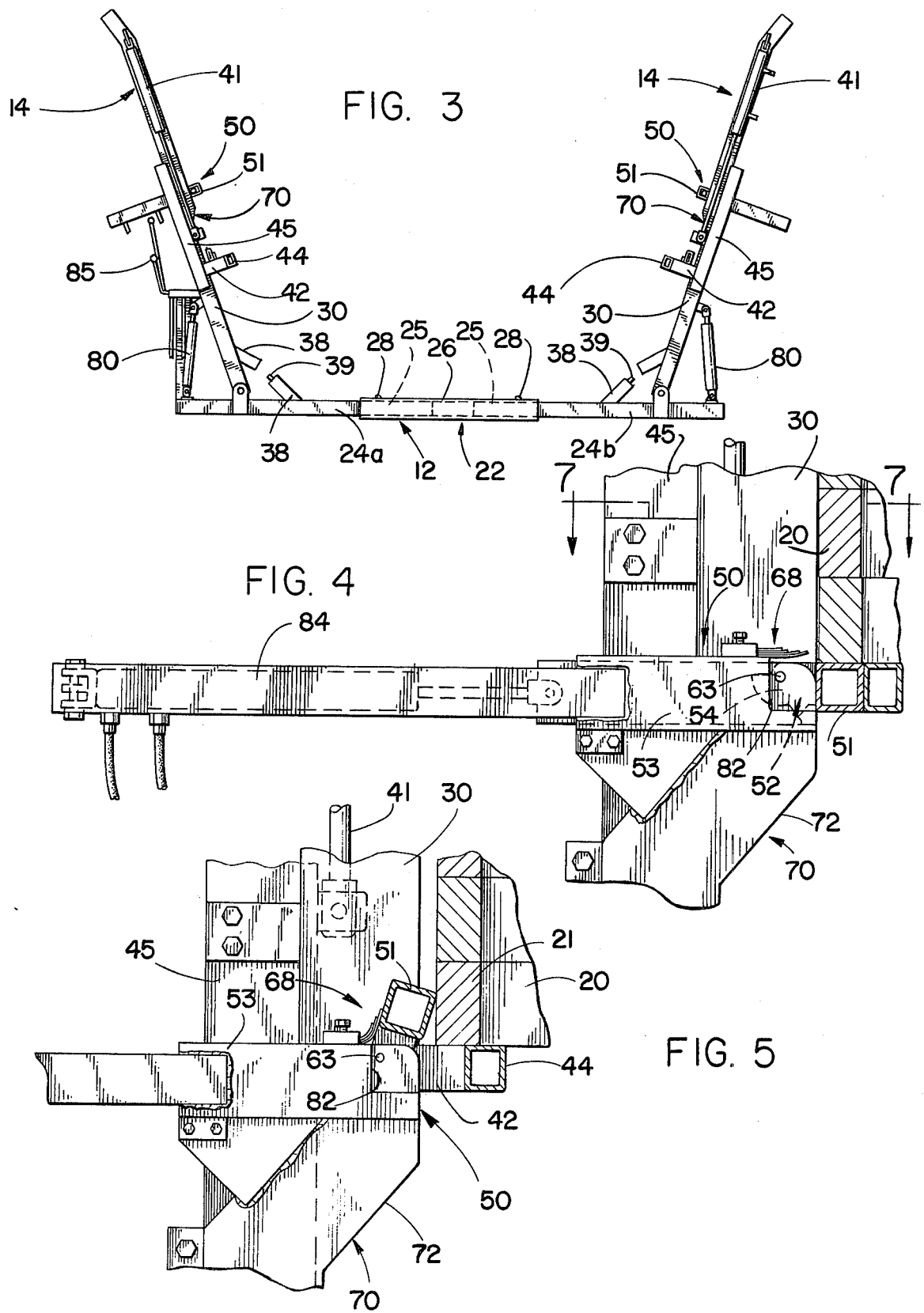

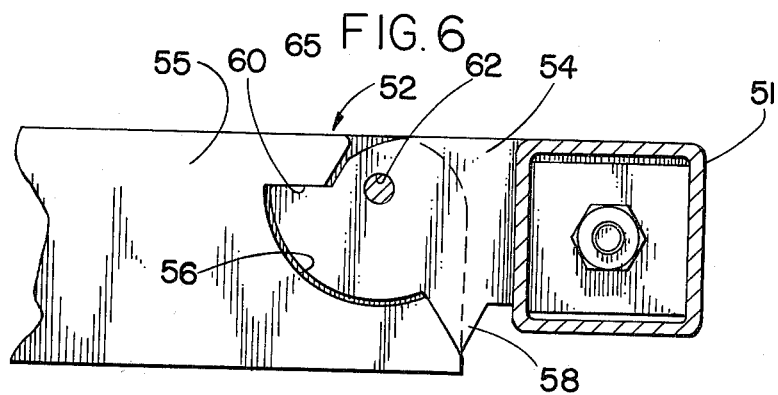
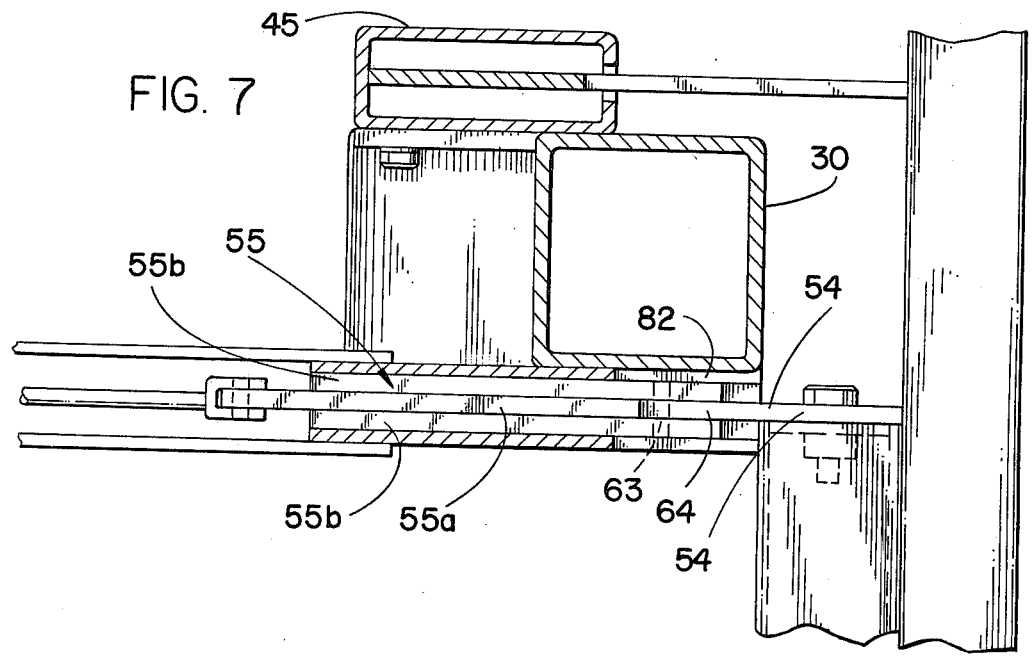
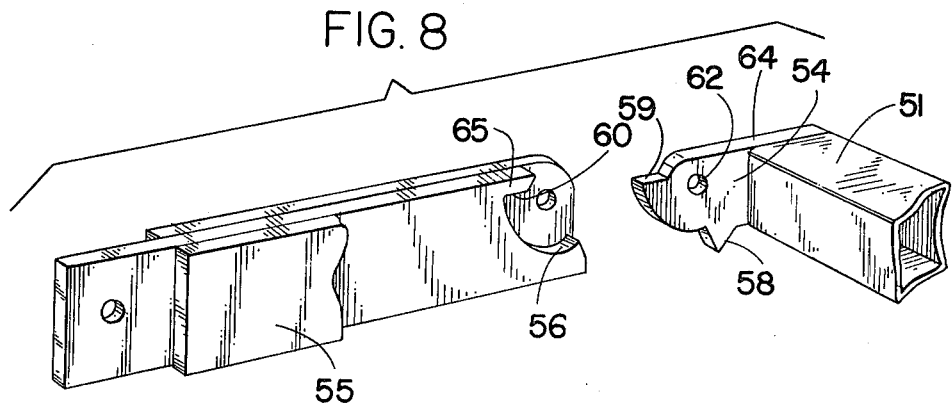

FRAME-HANDLING-AND-STACKING APPARATUS

BACKGROUND OF THE INVENTION

1. Field of the Invention

This invention relates generally to a material-handling device, and more particularly to the stacking and handling of building-frame sections.

2. Description of the Prior Art

As is well known in the art, various problems and difficulties are encountered in providing suitable means for handling and stacking frame sections for building structures. That is, in many areas of wood-frame construction, there has been developed an assembly-line method for buildings such as those in multiple housing projects, particularly where the wall-frame sections are of a generally standard size and configuration, the configuration being generally rectangular.

Presently, such projects—no matter how large—are constructed frame-by-frame, room-by-room, and floor-by-floor. Thus, carpenters construct a building piece-by-piece on the construction site.

In some areas of construction—such as, for example, in large apartment, condominium and townhouse complexes—the frame structures are constructed away from the building site, the frame sections being manufactured in an assembly-line method. Thus, each portion of a frame section is assembled as the basic framework moves down the assembly line. The work is generally performed within the shortest distance possible from the building site.

This assembly-line method produces more accurately aligned frame structures at a rate of speed not possible in on-the-site construction.

However, because of the increased production of wall frame sections in the assembly-line method, other problems have been generated—notably, removing the finished frame structure from the assembly line rapidly enough to allow the line to move in a continuous manner. It has been necessary to employ several men to physically lift and carry each heavy frame section. At this time, the frame sections must be stacked in a specific order of assembly. Again, several men and pieces of machinery are employed to do this. A further problem is that each stack must be readily available for transporting to the construction site.

Hence, it can be understood that much time is spent, manpower is needed, and additional machinery is required to complete the sections—thus, very often overcoming the advantages of an assembly-line method of construction.

Accordingly, from the following description of the present invention, it will be shown that the herein-disclosed apparatus not only allows for a continuous assembly operation, but also aids in an even greater production of finished constructed wall sections.

SUMMARY OF THE INVENTION

The present invention comprises an apparatus to be employed in the handling and stacking of framework sections and wall structures for building construction, particularly those framework sections that are constructed from typical wood studs.

This apparatus is used in combination with structural framing-assembly lines wherein frame sections are formed as they move in a continuous manner along a jigged conveyor system which is well known in the art, the present apparatus being positioned at the terminating end of the assembly line.

As the framework leaves the assembly line, it is readily received within the structural apparatus which comprises a base frame support that is adjustable to various frame widths. Pivotally mounted to the base are two oppositely disposed, tiltable, truss units, the framework section or wall being positioned therebetween so as to be raised and stacked.

The framework section is received on a carriage structure provided longitudinally along each truss unit, the carriage structure including a conveyor-assembly means, whereby the framework section is properly positioned to be raised in a stacked mode of operation by a carriage structure. That is, once the framework section is in position on the carriage structure, the carriage structure is raised vertically by a hydraulic system until it reaches and engages a suspension mechanism which allows a plurality of framework sections to be stacked one upon the other.

Thus, when a full stack of several frame sections is in a loading arrangement, various unloading and transferring vehicles can be employed. Due to the particular design of this apparatus, different types of unloading or transfer vehicles can be employed—such as a flat-bed truck which can be positioned between the opposing truss units, at which time the carriage structure is raised to engage the stack of frames and then lower them onto the truck. Once on the truck bed, the truss units are tilted outwardly, thus freeing the stack of frame members and allowing the truck to leave therefrom with the stack of frames.

Another method of removing the stacked frame members is to employ a type of fork-loader machine, whereby the forks thereof are inserted under the frames when they are in a raised and supported mode. Once the forks are positioned underneath the framework section, the side truss units are tilted outwardly—thus freeing the frame members. The stack of frames are then removed from the apparatus, either to a storage area or to the building site itself.

OJBECTS AND ADVANTAGES OF THE INVENTION

The present invention has for an important object a provision wherein wall-frame sections are received from an assembly line and automatically stacked for transfer to a transport vehicle, without the need of several workers.

It is another object of the invention to provide a stacking-and-handling apparatus wherein the associated assembly line can be continuously operated under a controlled-flow system, allowing for a more efficient assembly of frames—in order to prevent time loss and thus lower the overall cost of construction.

It is still another object of the invention to provide an automatic-stacking-and-handling apparatus that can be operated by one individual who controls the automatic hydraulic system of the apparatus.

It is a further object of the invention to provide an apparatus of this character that has relatively few operating parts in proportion to its total operation of handling and stacking the large frame sections.

It is still a further object of the invention to provide an apparatus of this character that is compatible with most types of transfer-handling vehicles, such as flat-bed trucks and fork-loading vehicles.

A still further object of the invention is to provide an apparatus for handling wood-framework or wood-framing structures wherein the apparatus is easy to service and maintain, and wherein the structure of the apparatus is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 3 is an end-elevational view showing the oppositely disposed truss units spread angularly and outwardly;

FIG. 4 is an enlarged cross-sectional view taken substantially along line 4—4 of FIG. 1, showing a plurality of frame members supported thereon;

FIG. 5 is an enlarged cross-sectional view illustrating how the frame members are moved past the supporting racks for either stacking or removing;

FIG. 6 is an enlarged portion of the shoe assembly showing the fulcrum member supported therein;

FIG. 7 is an enlarged cross-sectional view taken on line 7—7 of FIG. 4, with the shoe assembly also shown in section;

FIG. 8 is an exploded perspective view of the shoe assembly and fulcrum member.

DESCRIPTION OF THE PREFERRED EMBODIMENT

Figure 1:
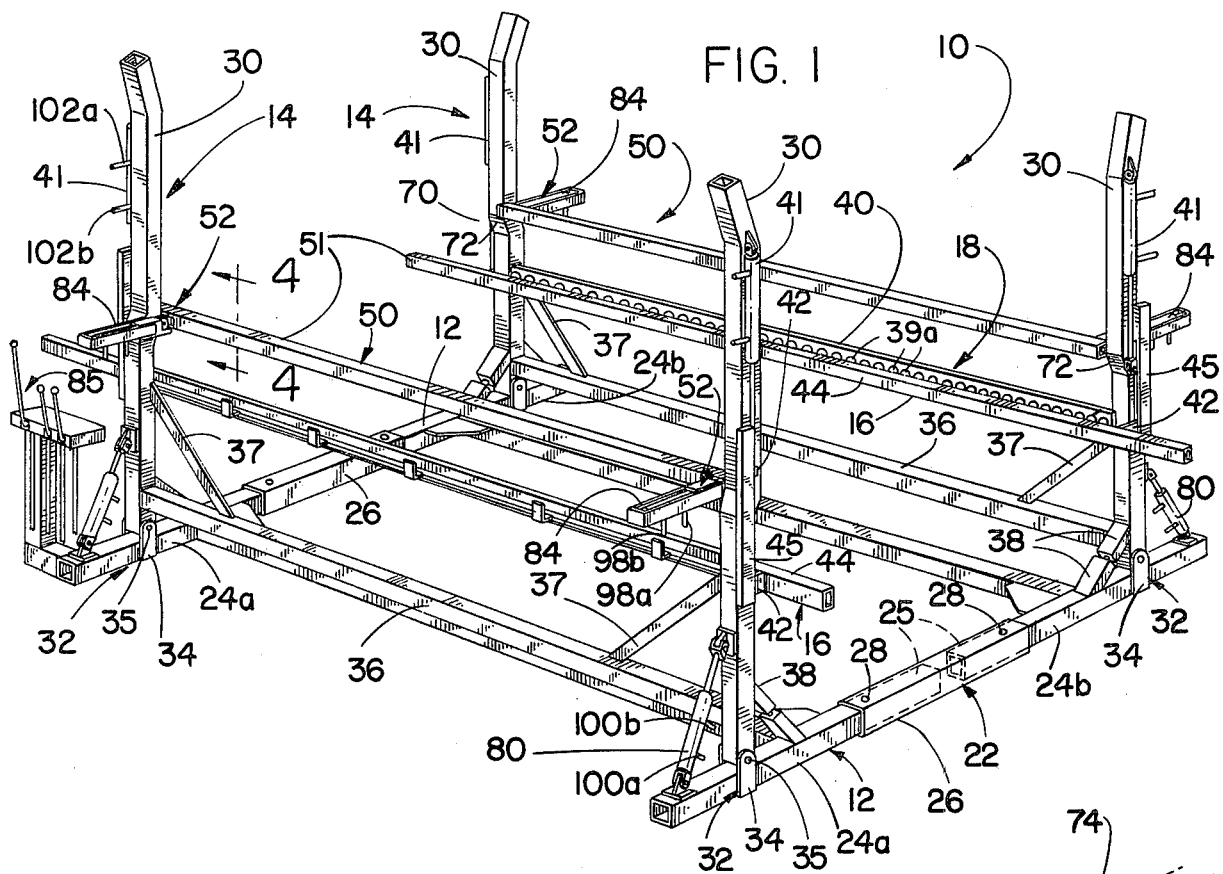
FIG. 1 is a perspective view of the present invention.

Referring more particularly to the drawings, there is illustrated a stacking-and-handling apparatus, generally indicated at 10, which comprises a base-support structure, indicated at 12, having a pair of tiltable side truss units, designated at 14, oppositely disposed in parallel relationship to each other. Each side truss unit 14 is provided with a carriage means 16 which is movable vertically with respect to the frame structure of the truss unit, said carriage means 16 including a conveyor means 18.

First, it should be understood that this apparatus has uses other than for the construction industry described herein. As previously mentioned, the present invention is positioned at the terminating end of an assembly line which comprises a method of continuously forming wood-frame sections or members that define wood-frame walls for building structures, such as houses, apartments, etc.

The assembly line, which is not shown, is well known in the art. This line allows for the construction of the wall frames as they are moved from the beginning of the line to the terminating end thereof. Thus, when a wall frame, indicated at 20, reaches the end of the assembly line, it must be handled and stacked. Accordingly, the present apparatus is adapted to receive the wall frame between the parallel-arranged truss units 14, whereby the wall frame is transferred from the assembly-line conveyor to the conveyance means 18 which allows the wall frame 20 to be positioned within the apparatus 10.

Due to the different types of buildings and their design requirements, the wall frames will vary in overall size and structure. This may require that the base-support structure 12 be adjusted in its width to accommodate such variations in frames. Accordingly, the support structure includes adjusting means, whereby the side truss units can be adjusted and moved with respect to each other.

Base-support structure 12, therefore, comprises a pair of box-beam members 24a and 24b which are positioned at the forward and rearward ends, respectively. The inner ends 25 of each box beam are slidably received in a corresponding tubular sleeve member 26 and secured therein by suitable means, such as pins 28. Thus, the adjustment of means 22 will set the distance between the truss units 14.

Each truss unit 14 comprises a pair of vertically positioned girder beams 30, one girder being pivotally attached to the front or forward-base support 12, and the other girder being pivotally attached to the rear-base support—thereby providing a pivotal means 32 by which each truss unit is allowed to pivot or tilt outwardly, as seen in FIG. 3. The pivot means is herein defined by a pair of upwardly projecting ear members 34 having pin 35 passing therethrough and through the bottom end of each respective girder 30. The respective pairs of girder members are secured together by a longitudinal connecting bar 36 and struts 37.

Figure 2:
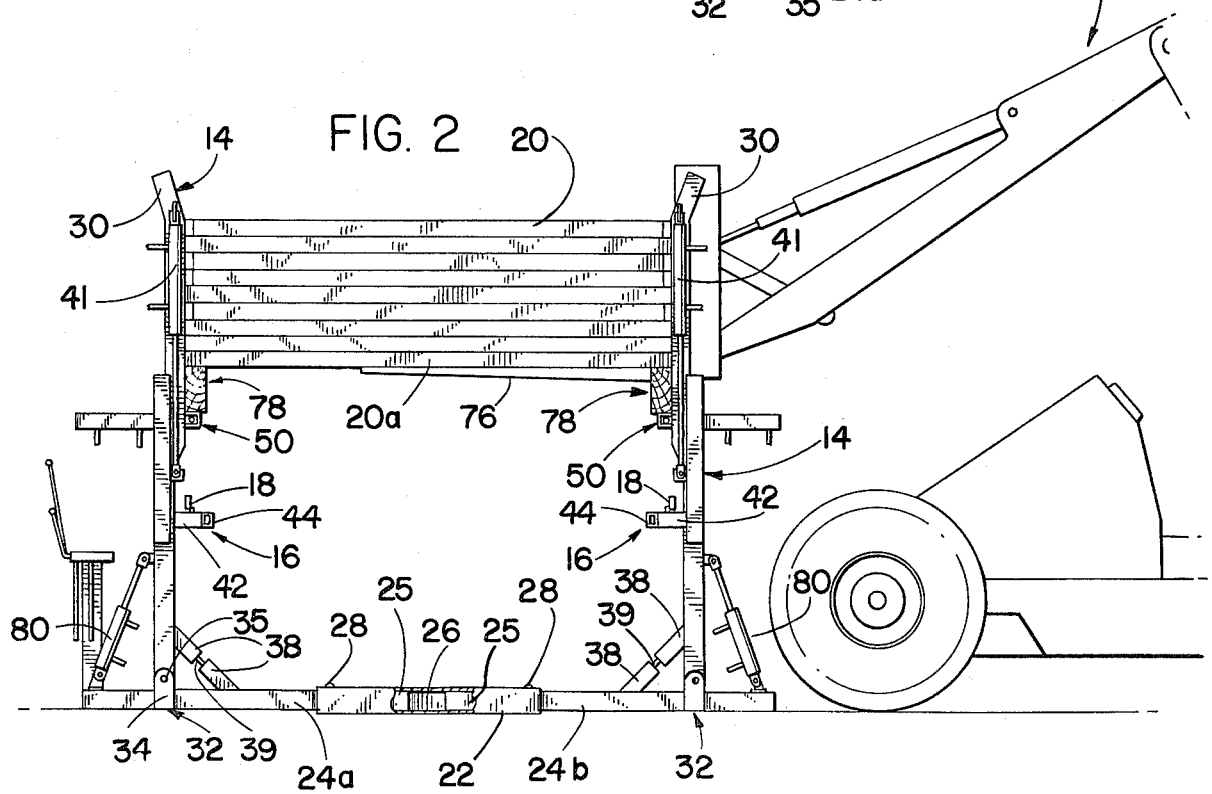
FIG. 2 is an end-elevational view showing a plurality of stacked wall-frame sections being prepared for unloading from the apparatus.

A stop means is also provided between the truss units 14 and the base-support structure 12. The stop means comprises a split-leg member 38, each piece thereof being secured angularly between girder 30 and beams 24a and 24b. One of said split-leg pieces includes an adjusting pin 39 whereby the girders can be adjusted in a true vertical position, as seen in FIG. 2. Thus, leg member 38 is permitted to separate, as seen in FIG. 3.

Affixed to the truss units 14 is the conveyance means 18 which comprises a longitudinal bar 40 secured between each front and rear girder 30, and having a plurality of rollers 39a extending inwardly of bar 40 so as to receive and movably support each side of the wood-frame structure 20 as it rolls off the assembly line. The frame structure 20 is then positioned within the apparatus so as to be engaged by carriage means 16, in order to raise frame 20 to a stacked position. To accomplish this, carriage means 16 comprises a pair of arm members 42 which are slidably supported to each girder beam 30. That is, each girder beam has an arm member 42 mounted thereto and connected to hydraulic motors 41 to cause a reciprocating up-and-down movement thereof along the longitudinal length of each beam 30. The arm members are arranged to include a longitudinal support sill 44 that extends horizontally from the rear-girder beam to the front-girder beam. Thus, there is provided a pair of oppositely disposed parallel sill members 44 that are carried by arm members 42 which are adapted to slide within their respective guide-sleeve members 45.

Accordingly, when a frame structure 20 is in position, sills 44 are raised to engage and support frame 20. As frame 20 is raised to a stacked position, it must engage a floating-rack means, generally indicated at 50. Once past the rack means—that is, once frame structure 20 is raised above rack means 50—it can then be lowered to rest on said rack means in a stored mode for stacking thereupon succeeding frame structures.

The floating-rack means comprises a pair of parallel oppositely disposed rack bars 51 which are positioned longitudinally between the front and rear girder members 30. Each rack bar 51 is affixed to a movable suspension means 52, the suspension means being secured to each of said girders adjacent the front and rear ends of the rack bars. Thus, each suspension means 52 comprises a sleeve housing 53 affixed midway between the ends of girder members 30. A shoe assembly 55 is slidably positioned in said sleeve housing, the shoe assembly being formed by a central shoe plate 55a and side plates 55b, to which a fulcrum member 54 is rotatably mounted. Rack bar 51 is affixed to the projecting free end of the fulcrum member 54, whereby rack bar 51 will pivot upwardly with the respective fulcrum members. Shoe plate 55a is provided with a segmented circular recess 56, one end of said fulcrum member 54 being formed so as to be located therein in order to be rotatably supported.

To provide for a normal linear projection in a horizontal relationship, fulcrum 54 includes a depending lug member 58 which acts as part of a stop means to limit the downward rotation of fulcrum 54 and rack bar 51. The stop means further includes a flat shoulder 59 formed on fulcrum 54 which engages against the upper flat surface 60 of recess 56. Fulcrum 54 includes a hole 62 through which pin 63 is received, pin 63 being supported in side plates 55b. Thus, fulcrum member 54 is allowed to rotate upwardly about pin 63 to a point where flat edge 64 abuts lug 65 of shoe plate 55a. Hence, rack bar 51 can be raised to a clearing position as seen in FIG. 5, whereby side member 21 of wood-frame section 20 engages bar 51—thus caming it upwardly against biasing means 68 and allowing the frame section to rise above bar 51, at which time bar 51 is biased back to a horizontal position under the frame section and supports frame section 20.

In order to stack several frame sections, one upon the other, the above steps are repeated. However, as the frame section engages rack bar 51, the previously stacked frame sections will be lifted upwardly and dropped onto the raised frame section 20 as bar 51 is cammed upwardly and outwardly. The stacked frame sections are raised to allow bar 51 to spring back into a supporting position, as seen in FIG. 5. The floating-assembly means is then lowered to receive another frame section from the assembly line.

At this time, it should be noted that each girder 30 is provided with an offset arrangement wherein the upper half of the girder is bent inwardly as at 70, whereby an inclined surface 72 is formed so as to define a means to accurately position the group of stacked frames in true alignment. That is, if a frame section is not positioned evenly between the opposing truss units, it will be adjusted properly as it is raised past the opposing inclined cam surfaces 72.

FIG. 2 illustrates a group of stacked frame structures 20 being prepared for removal. Two methods can be employed for the removal of the frames—one being, as illustrated, the use of a fork-loading vehicle, indicated at 74. Prior to the engagement of the frames by the fork members 76, support means 78 are provided to suspend the frames above the rack bars, whereby fork members 76 can be positioned over said rack bars and under the bottom frame structure 20a. Once the forks are in place, the truss units are moved outwardly at an angular position, as shown in FIG. 3. This allows the stack of frame structures to be freed from the apparatus and to be lifted therefrom, so that they can be moved to another location. Accordingly, to activate each truss unit, there is provided a plurality of hydraulic actuators 80 that are interconnected between each girder member 30 and the base 12.

The other removal method is to back a flat-bed truck (not shown) between the truss units and under the stacked frame structures 20. At this time, the sills 44 are raised to engage and lift the frames above rack bars 51. Once freed, rack bars 51 are linearly retracted into notch 82 of housing 53 by hydraulic actuators 84 which are attached to shoe assembly 55. When retracted, rack bars 51 are recessed to allow the frames to be lowered between the truss units and onto the truck bed. After the frames are supported by the truck, the truss units can then be moved outwardly by hydraulic actuators 80. Suitable control means such as levers 85 are provided to actuate the various hydraulic actuators 41, 80 and 84.

Figure 9:
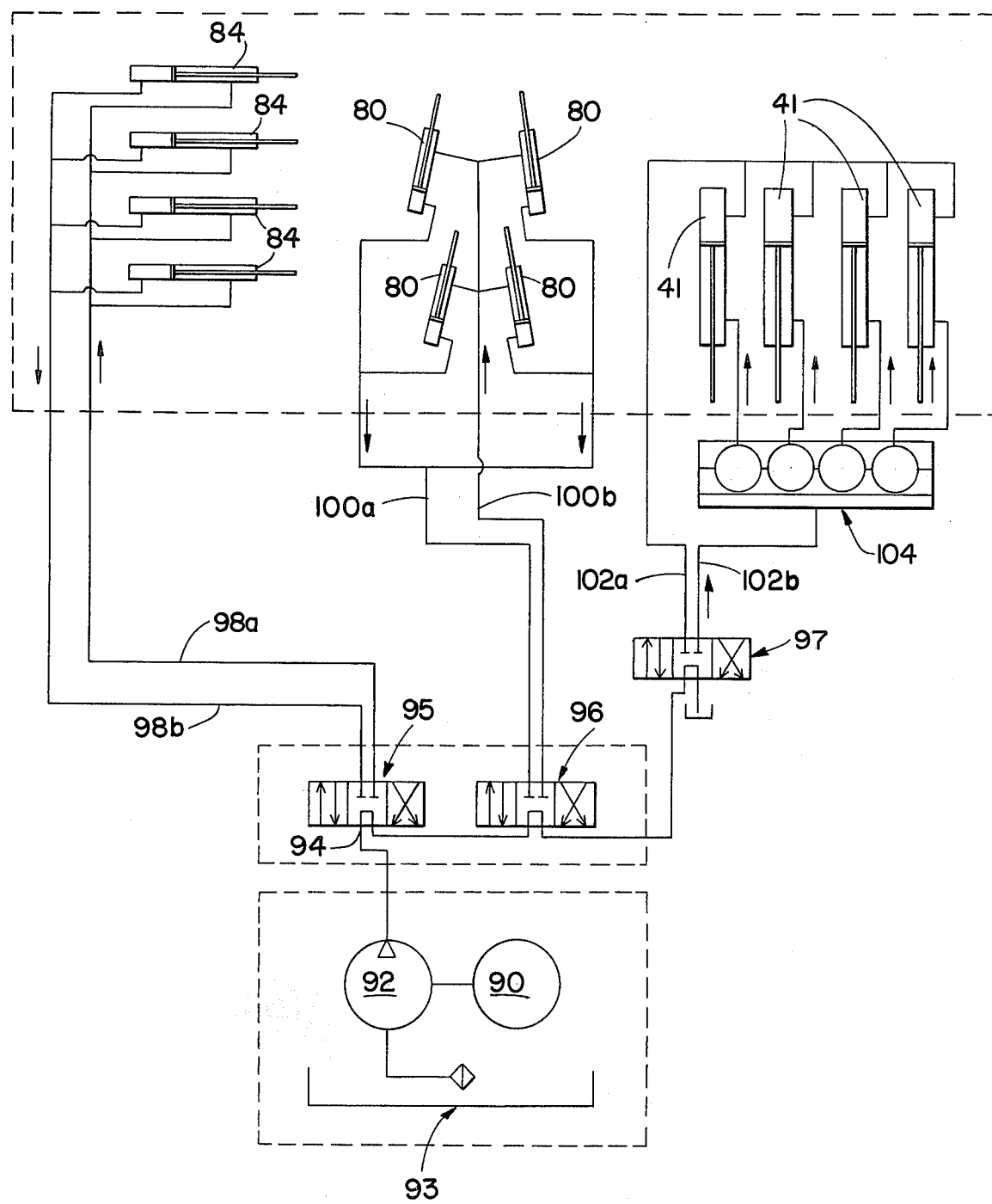
FIG. 9 is a diagrammatic view of the hydraulic system.

FIG. 9 is a diagrammatic view of the hydraulic system which is typical of many operations using several groups of hydraulic actuators. Thus, the system includes a drive motor 90 having a pump 92 connected to a reservoir 93 in order to supply fluid under pressure throughout the system. Connected to the outgoing pump line 94 are three sets of valve controls 95, 96 and 97.

Valve control 95 is connected to the four hydraulic actuators 84 by flow lines 98a and 98b which operate the linear movement of each shoe assembly 55. Valve control 96 operates the four hydraulic actuators 80 through flow lines 100a and 100b. Actuators 80 cause the truss units to move on the base support 12. Valve control 97 is connected by flow lines 102a and 102b to hydraulic actuators 41 that lift the sill bars 44. Since it is important that actuators 41 operate together under a given pressure, there is included in line 102b a balancing means 104.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:
1. A handling-and-stacking apparatus for wooden frames and like structures, comprising:
 a base-support structure;
 a pair of tiltable truss units pivotally attached to said base-support structure, said truss units being positioned opposite and parallel to each along said base structure;
 wherein each of said truss units comprises:
 a front, vertical girder member;
 a rear, vertical girder member; and
 a longitudinal bar member interconnecting said front and rear girder members, whereby said front and rear girders move together from a vertical position to an angular tilted position;
 means for pivotally mounting said truss units to said base structure so as to be tilted outwardly thereof;

conveyance means mounted between said truss units and adapted to receive a frame structure thereon for locating said frame structure between said truss members;

carriage means operably mounted to said truss units and adapted to be moved vertically upward and downward from said truss units while carrying said frame structure thereon;

wherein said carriage means comprises:

an elongated sill member positioned longitudinally from said front girder member to said rear girder member, and positioned below said conveyance means;

a pair of arm members secured to said sill member, each arm member being slidably supported in respective front and rear girder members;

a rack assembly mounted to said truss units and positioned above said carriage means, in order to receive a frame structure from said carriage means and support said frame structure thereon; and a power-operating system operably connected to said truss units, said carriage means and said rack assembly.

2. An apparatus as recited in claim 1, wherein said rack assembly comprises:

a pair of oppositely disposed rack-bar members positioned longitudinally between said front and rear girder members, in parallel relationship to each other; and a movable suspension means secured to said respective girder members and operably attached to said rack-bar members, said suspension means being movable by said power-operating system.

3. An apparatus as recited in claim 2, wherein said movable suspension means comprises:

a sleeve housing secured to said respective girder members;

a shoe assembly slidably positioned within said sleeve housing, said housing being connected to said power-supply system; and a fulcrum member movably mounted to said shoe assembly and having said rack-bar member attached thereto for rotational movement therewith, said fulcrum member and said rack-bar member being linearly slidable with said shoe assembly.

4. An apparatus as recited in claim 3, wherein said shoe assembly comprises:

a central shoe plate having a semicircular recess adapted to rotatably support said fulcrum member therein; and means formed between said central shoe plate and said fulcrum member for limiting the rotational movement of said fulcrum member.

5. An apparatus as recited in claim 4, wherein said means for limiting the rotational movement of said fulcrum member comprises:

a depending-lug member and a flat-shoulder member formed on said fulcrum member for engagement with said shoe plate, in order to establish a horizontal position to support said frame structures in a stacked arrangement within said apparatus;

said shoe plate having a lug member formed thereon to engage said fulcrum member when said fulcrum member is rotated to a raised position.

6. An apparatus as recited in claim 1, wherein said truss units include means for positioning said units in a substantially vertical position, said means being mounted between said girder members and said base-support structure.

7. An apparatus as recited in claim 6, wherein said means for positioning said truss units comprise a split-leg member forming two sections, one section thereof secured adjacent the lower end of said girder member and the other section secured to said base-support structure, and wherein an adjusting pin is mounted to one of said sections.

8. An apparatus as recited in claim 1, wherein said base support structure includes means for adjusting the distance between said truss units.

9. An apparatus as recited in claim 8, wherein said adjusting means comprises:

a pair of box-beam members oppositely disposed and aligned with each other;

a tubular sleeve member adapted to receive each opposing box-beam member therein, so as to be movably adjusted therein; and locking pins adapted to be received in said sleeve and said box-beam members when the distance between said truss units is determined.

10. An apparatus as recited in claim 3, wherein said conveyance means comprises a longitudinal bar secured between each front and rear girder member, said bar having a plurality of rollers affixed thereto and extending inwardly from said bar, so as to receive and movably support each side of said frame structure between said truss units.

11. An apparatus as recited in claim 3, wherein each of said girder members includes an upper and a lower portion, said upper portion being offset inwardly from said lower portion, and a cam surface being defined therebetween to provide an alignment means for stacking said frame structures, one upon the other, in a succeeding manner.

12. An apparatus as recited in claim 3, wherein said power-operating system includes:

a first group of hydraulic actuators operably connected between said girder members and said carriage means, whereby said carriage means is movable upwardly and downwardly along the length of said girder members;

a second group of hydraulic actuators operably connected to said rack assemblies, whereby said rack bar thereof is moved linearly inward and outward from said truss units; and a third group of hydraulic actuators operably connected between said base-support structure and said girder members, whereby said truss units are moved from a vertical position to an outwardly angular position.

13. An apparatus as recited in claim 12, wherein said power-operating system includes:

a drive motor;

a pump means driven by said motor; and a reservoir to supply fluid within said system.

* * * * *